June 16, 1959 LA VERN H. BARRETT 2,890,784
FEEDER FOR PACKAGING MACHINES
Filed April 8, 1957 4 Sheets-Sheet 1

INVENTOR.
LA VERN H. BARRETT
BY
his ATTORNEY

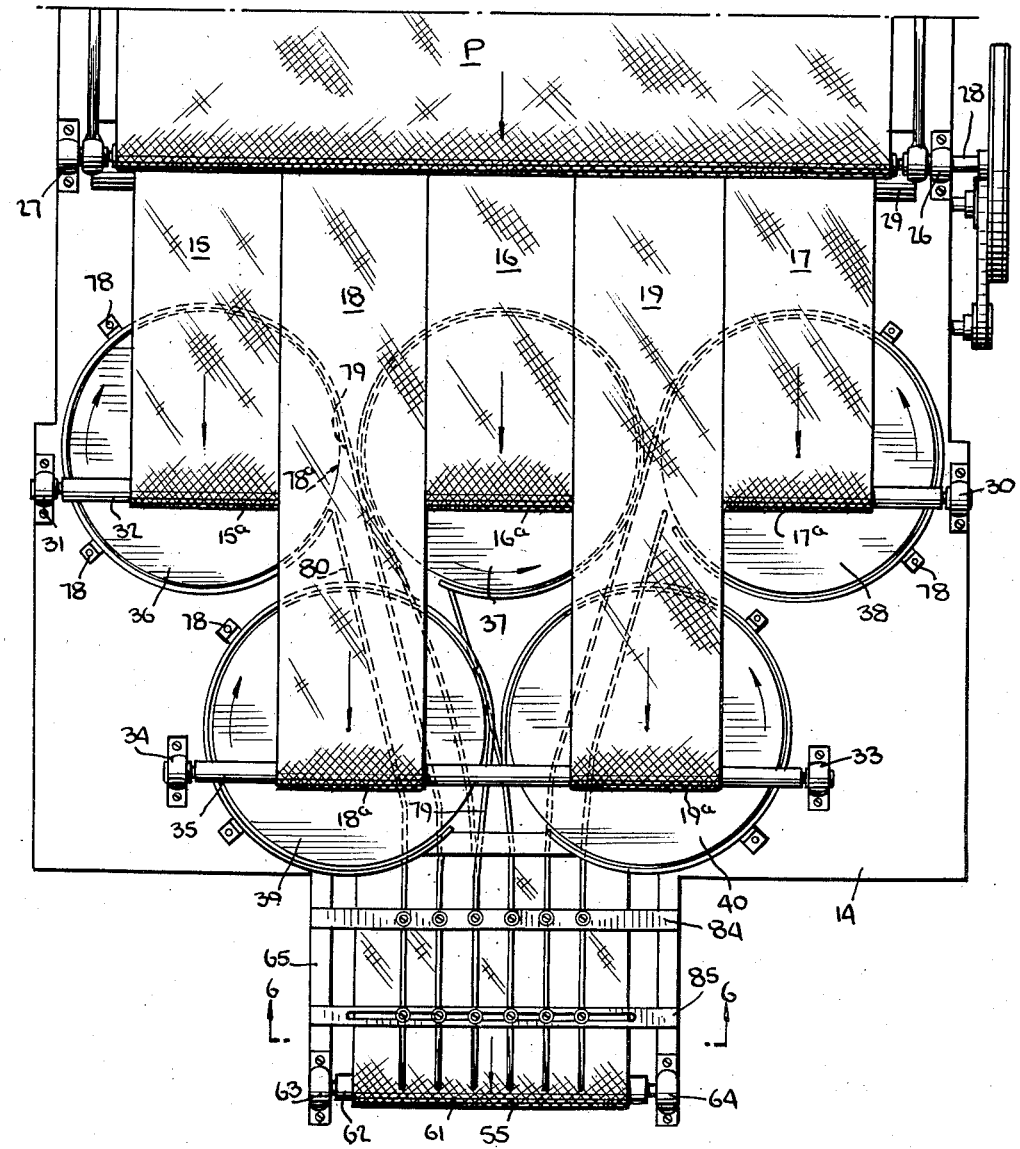

June 16, 1959
LA VERN H. BARRETT
2,890,784
FEEDER FOR PACKAGING MACHINES
Filed April 8, 1957
4 Sheets-Sheet 3
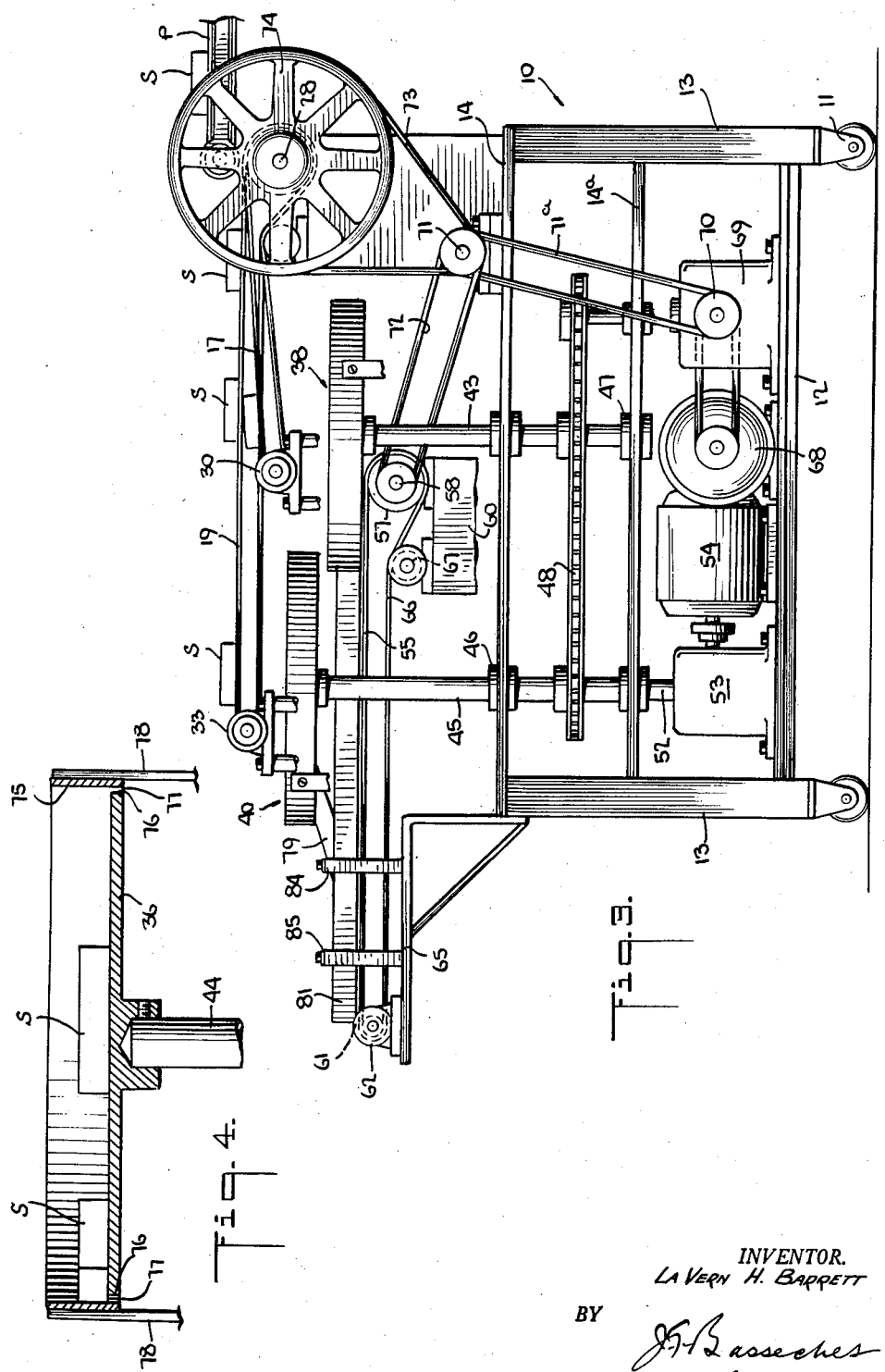
INVENTOR.
LA VERN H. BARRETT
BY
his ATTORNEY June 16, 1959 — LA VERN H. BARRETT — 2,890,784
FEEDER FOR PACKAGING MACHINES
Filed April 8, 1957 — 4 Sheets-Sheet 4

INVENTOR.
LA VERN H. BARRETT
BY
his ATTORNEY

United States Patent Office 2,890,784
Patented June 16, 1959

2,890,784

FEEDER FOR PACKAGING MACHINES

La Vern H. Barrett, Lyons, N.Y., assignor to Manett Enterprises, Inc., New York, N.Y., a corporation of New York Application April 8, 1957, Serial No. 651,373

16 Claims. (Cl. 198—30)

This invention relates to an automatic packing assembly and more particularly to an automatic conveyor assembly for preliminarily orienting products for packing and to a packaging assembly therefor.

Still more particularly, the invention relates to preliminary arrangements of articles to be packed and still more particularly to the packaging of food products.

It is known to provide assemblies of products preliminarily to packaging the same in units. Such assembly apparatus, while successful in a measure for uniformly sized and prepared products of rugged texture, having relatively uniform physical characteristics as to weight, volume and consistency, have consequently limited application and have not been successfully applied to the packaging of products which, by reason of necessary economies, are not uniform in weight, size and shape or in physical characteristics. Delicate food products, such as fish, meat, preparatory to deep freezing or other processing, by reason of such variance in physical properties as well as in constitution of such food products, offer particularly difficult problems, as will be recognized by the packers of these products.

It has been found particularly arduous to deal with the assembly of fish products, and like fried or cooked products, more specifically fish sticks, in a preconditioned form or raw frozen form, by reason of the differing physical characteristics of fish sticks, to the point where the packaging of this product has been effected entirely manually, with a consequent high cost due to the labor that is involved.

It is an object of the invention to provide an assembly including novel expedients for a preliminary arrangement of food products, and more specifically fish sticks, processed in the raw state or in a pre-conditioned state, which will effect substantial economies in labor and avoid loss of appearance and coating materials by reason of the attrition incident to handling of these products.

Still more particularly, it is an object of the invention to provide preliminary arrangement of fish sticks or like food products as they may come from a preliminary processing in the raw state or in a partially prepared state, particularly for deep freezing, and to packaging apparatus therefor which has great versatility in the handling of these food products with regard to size and physical characteristics, effecting economies in labor and avoiding loss of coating and consequent detraction in the appearance of the material to be packaged.

Still more particularly, the invention relates to assembly apparatus for fish sticks in the processed raw state or in the processed preliminarily cooked state, assuring rapid handling, and more specifically providing inter-related novel packaging therefor, having great adaptability to the form size, quantity and grouping of the individual elements to enter into the package.

The apparatus is exemplified in connection with fish sticks, i.e. elongated, preferably oblong cross-sectioned fish sticks, it being understood that the apparatus has great versatility in modification for the handling of other food products so that they may be arranged and grouped preparatory to being made into packages of modern size and shape, adaptable to the convenient storage in household and retail store freezers.

In exemplifying the food to be packed in accordance with the apparatus to be described, fish is preliminarily processed to sever the same into sticks or fingers of three to five inches in length and three-quarter to one inch sides. Such operation is accomplished from blocks of the frozen fish, varying in size and cross section and necessarily producing a variability in dimensions. In the frozen condition, the fish may be coated with seasoning, batter, and bread crumbs, and while maintaining them in a raw state, or in a partially cooked state, by reason of such processing, result in a random arrangement of these elongated units. The elongated units in this random condition, and by reason of their fragile texture, afford a problem in handling preliminarily to packaging which it is one phase of this invention to overcome. For this purpose, the fish sticks or fingers are more conveniently handled if they can be quickly arranged or oriented in parallelism and in predetermined numerical grouping for packaging or for further manual handling.

One phase of the assembly in accordance with this invention is to provide means for converting or orienting a random arrangement of the fingers or sticks or like elongated food products into parallelism and in a preliminary grouping of units, for example, in a preliminary grouping of five, so that such unit or multiples thereof may then be conveniently, speedily counted and boxed, with assurance that a full count and weight are achieved, and the texture and desired appearance are preserved.

A problem in connection with handling fish sticks particularly involves losses incident to breaking of the coating, such as the breading which may have been applied thereto, by contact or by attrition or coherence of one stick with another. The tenderness of the body of material of which the food, particularly fish sticks, is made and/or the coating or breading, had been considered as requiring leaving the handling of such food products to the skill of manual labor. Such procedure, which entails not only the training but the availability of skilled labor, has made the packaging of food products costly, and it is the objective of this invention to provide the apparatus to minimize the use of manual labor for the handling of these food products, to secure more or less an automatic assembly for speed of processing the product, as well as to assure against unnecessary losses occasioned by the variability in size, texture, appearance, weight, consistency of the food product to be handled, and assuring a maintenance of hygienic conditions.

To attain these objects and such further objects as may appear herein or be hereinafter pointed out, I make reference to the accompanying drawings, forming a part hereof, in which—

Figure 2 is a plan view thereof, underlying a delivery apron;

Figure 3 is a side elevational view from the right side of the assembly;

Figure 4 is a magnified sectional view of a detail of a turntable;

Figure 1:
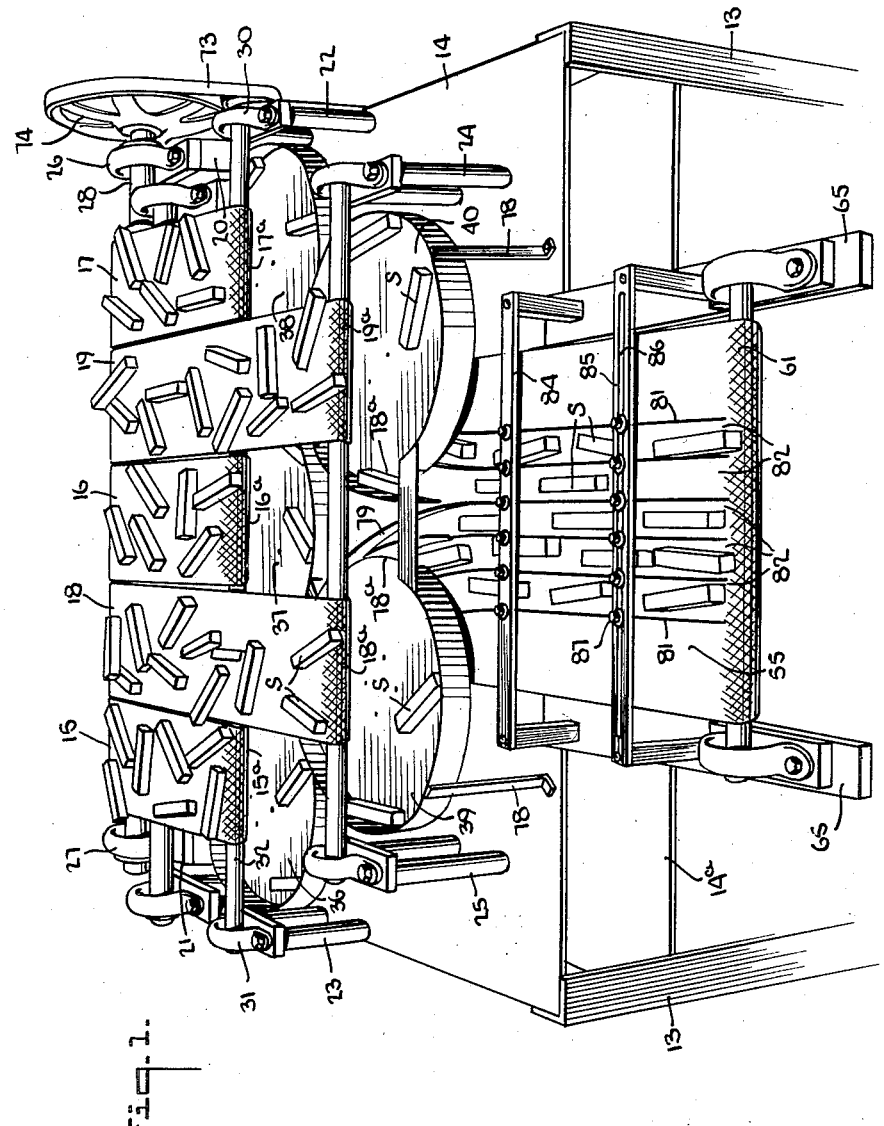
Figure 1 is a perspective view of my orienting, grouping assembly.
Figures 5, 6:
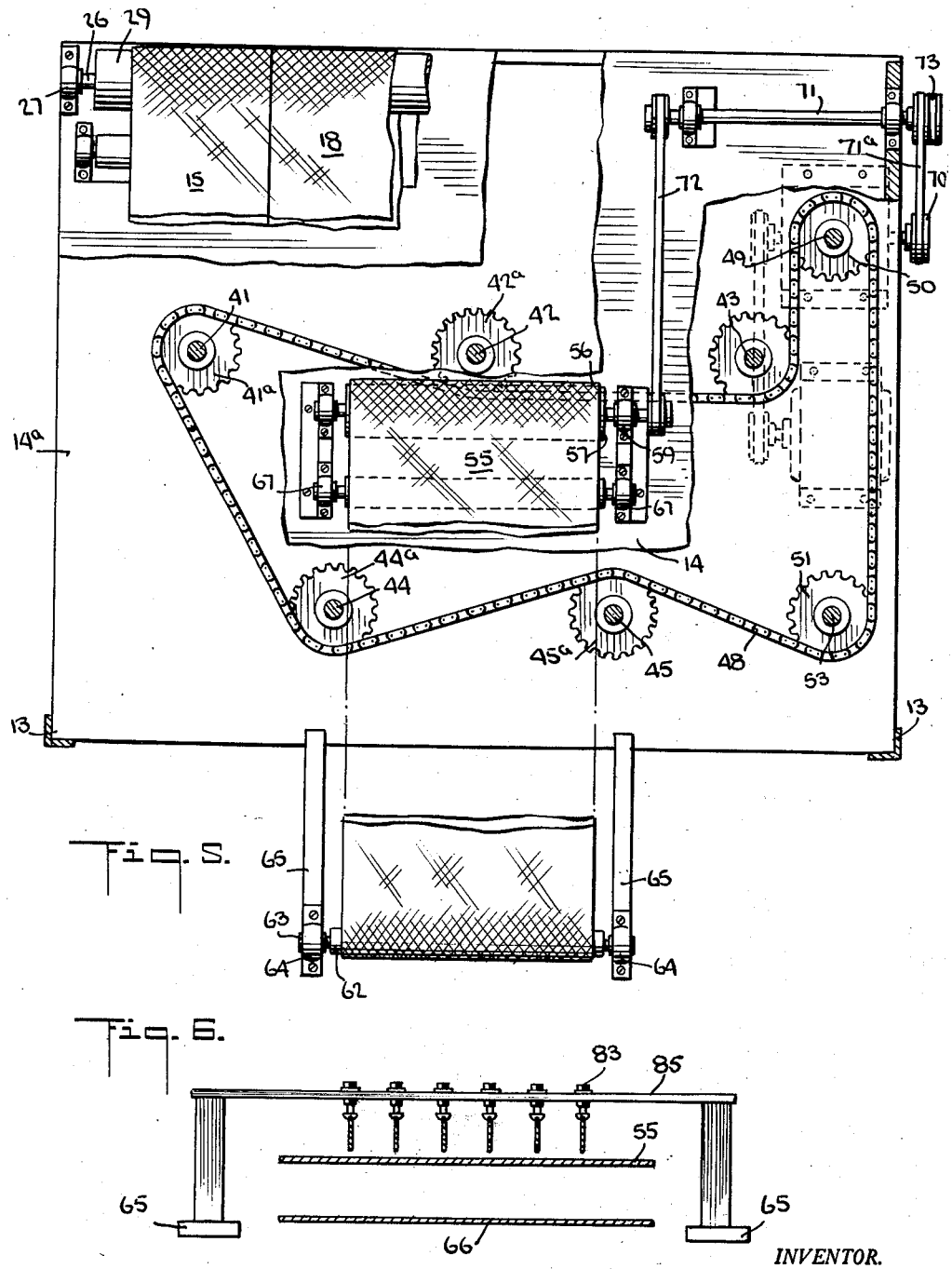
Figure 5 is a staggered section taken on the line 5—5 of Figure 3.
Figure 6 is a fragmentary section taken on the line 6—6 of Figure 2.

The specific assembly which is illustrative of my invention deals with the essentials of the orienting and grouping of elongated units, such as fish sticks, particularly those which are sawed from large blocks, to provide reasonably flat sides which may slide on smooth surfaces with minimum rolling or tumbling action.

In the specific illustration, the sticks may, by known means, have been cut from a block, breaded and covered with a batter, and either fully or partially treated by frying and fast freezing, and have been unloaded from the processing plant in promiscuous or haphazard, random arrangement upon the delivery apron or conveyor belt.

In accordance with an object of this invention, the haphazardly deposited charge of fish sticks or the like is distributed or the deposit attenuated to remove the discharge at a fast rate, endeavoring to remove the processed sticks in the sequence of the completion of the processing of the treatment to secure a single layered distribution on contiguously arranged conveyors, and then to provide a cascading layer in close proximity to orientors in grouped relation. Close proximity of the cascaded deposit and orientors to minimize tumbling and consequent abrasion losses of the sticks is a specific feature of my invention and in accordance with the preferred form of my construction, the cascading means are directed to deliver the preliminary layer of sticks to a turntable rotated at a speed to exert a centrifugal force of balanced magnitude to move the sticks from adjacent an axial position or eccentric position to the periphery of the turntables, limited by a circumferentially extended ledge surrounding the periphery, to move the stacks into a chordal position, and progressively to follow the turntables until encountering a forwardly directed chute substantially tangential to the turntable. Staggered positioning of the turntables permits close positioning of the chutes, to group the oriented sticks upon a conveyor belt, to provide a plurality of columns of the sticks so closely organized to facilitate further handling and grouped inspection preparatory to counting, and to simplify packaging manually or automatically.

For a further understanding of my invention, I make references to the drawings, in which a carriage frame 10 is provided with convertible rolling means 11 for portable movement to and from filling or processing stations, where batch processing may be practiced or for permanent assembly in a continuous-flow production and packaging line.

The carriage 10 includes a platform 12, supported on the uprights 13, which carries the powerized units and transmission assembly and independent controls, the purpose of which will be amplified as this description proceeds.

Overlying the platform 12 on the standards 13 is the plate 14, from which are extended the cascading conveyors 15, 16, 17, 18, 19, by the provision of rear standards 20, 21, intermediate standards 22, 23 and forward standards 24, 25. The bracket or standards 20, 21 support journals 26, 27 for the drive shaft 28 upon which is mounted the drive pulley 29.

Intermediate standards 22, 23, respectively, support journals 30, 31 for the idler shaft 32. Forward standards 24, 25 support journals 33, 34 for the forward idler shaft 35. Cascading conveyors 15, 16, 17 extend from the drive pulley 29 to the idler shaft 32, whereas conveyors 18 and 19 extend from the drive pulley 29 to the forward idler shaft 35. The arrangement provides intermediate spill edges 15a, 16a and 17a and forward spill edges 18a and 19a.

With the grouped cascaders as described, there is positioned the intermediate turntables 36, 37, 38 and the forward turntables 39 and 40. The intermediate turntables 36, 37, 38 are endwisely supported on the vertical drive shafts 41, 42, 43. The forward turntables 39 and 40 are endwisely supported on vertical drive shafts 44, 45.

The endwise position with respect to the vertical shafts of the turntables 36, 37, 38 is to extend the same in a different and lower plane than forward, higher turntables 39 and 40, thereby to cluster these tables in an overlapping, staggered position compactly. Their relation to the spill edges described is preferably eccentrically to overly the turntables, although an axial alignment of the spill edges to the longitudinal axes of the cascaders is not objectionable.

The turntables in each case have their supporting surfaces so closely related to the spill edges to be well within the length of the minimal lengths of the fish sticks or elongated units, to be fed as will appear.

The vertical shafts 41, 42, 43, 44, 45 extend through bearings 46 in the plate 14 and then extend into end thrust bearings 47 of the intermediate plate 14a.

The drive for the turntables and shafts therefor include sprockets 41a, 42a, 43a, 44a, 45a, coupled by the chain drive 48 to the idler sprocket 49 on the stub shaft 50 and, in turn, to the drive sprocket 51 on the drive shaft 52 to the speed reducer transmission box 53 driven by the motor 54, which has variable speed control means (not shown but which will be readily understood).

Extended over the plate 14 beneath the turntables is the conveyor belt 55, the rear flight 56 of which is guided over the drive pulley 57 on the shaft 58 supported on journals 59 on the upper edge of the bracket 60.

The forward flight 61 is guided over the guide roll 62 mounted on the shaft 63, trunnioned in the journals 64 on the bracket arms 65. The return flight 66 of the conveyor belt 55 is guided on the idler roll 67 extending from the bracket 60.

A motor 68 is coupled to the transmission 69 to drive the sprocket 70. The chain drive 71 is coupled with the sprocket 70 to drive the countershaft 71. The countershaft, through the chain belt 72, is coupled to the drive shaft 58 to operate the conveyor 55. Chain belt 73 is coupled with the sprocket wheel 74 mounted on the drive shaft 28, previously described.

As in the prior described motor control, motor 68 and the driven members, coupled as described, may be adjusted for rotation at variable speeds, as will appear hereinafter.

With the assembly as provided, each of the turntables 36, 37, 38, 39, 40, with its peripheral edges, is substantially enclosed in upstanding, substantially circumferential ledges 75 (see Figure 4), held spaced from the peripheral edges 76 to provide a gap 77. Standards 78 extend from the ledges above the plate 14.

The ledges in each case define a gate 78 outlined by substantially tangential parallel chute partitions 79 and 80, running in pairs for each of the turntables 36, 37, 38, 39, 40 from the gates 78, converging angularly downwardly over the conveyor 55. It is to be observed that the partitions leading from the turntables 36 and 37 pass substantially beneath the turntable 39, whereas the partitions leading from the turntable 38 pass beneath the turntable 40 and all of the partition extensions 81 are then converged and grouped contiguously in substantial parallelism at the forward portion of the conveyor flight to form, with the conveyor belt, parallel guiding chutes 82 in close proximity, supported in parallelism by the overhead hangers 83 adjacent the turntables on the cross bar 84 for variable heights, and adjustably held in relation to each other by the cross bar 85, which is slotted at 86 to receive the laterally adjustable, screw-threaded bolts 87, to which the partitions 81 are affixed vertically so as to be spaced to and from each other in accordance with such closeness and compactness of grouping on the conveyor as may be desired, or found possible by reason of the thickness of the sticks.

With the construction as described, the method of operation of the orienting feeder will be apparent.

Elongated articles to be oriented by the assembly feeder 10 are brought in close proximity to the apron or conveyor P upon which random deposition of the sticks is effected from the processing station. Manually or automatically coordinated deposition may be effected in accordance with the facilities at the processing plant. The promiscuously or randomly deposited feed products are then deposited on the cascading conveyors, the surface speeds of which are adjusted to move to spread out the deposit from the point of deposition at a greater rate than that at which the sticks are fed upon the conveyor from the processing vats or like treating stations.

The elongated sticks are then carried toward the spill edges 15a, 16a, 17a, 18a, 19a, from which the sticks spill over onto the turntables 36, 37, 38, 39, 40 in an overlapping position beyond the gates, to drop in back of the gates instead of in advance of the same. These latter turntables are high polished, rotating surfaces about a vertical axis, as described, effective in the direction centrifugally to move the sticks to the peripheries and ledge of each turntable in the effective direction of emergence of the gates 78 and partitions 79 and 80. The past-gate-deposition position of the spill edges assures a movement of the sticks to arrange themselves chordally against the ledges 75 as the limit of peripheral movement is reached before contact with the gates 78 and therefore minimizing bruising of the sticks. Close positioning of the spill edges to the turntable surfaces for spacing within the limits of length of the sticks avoids tumbling of any consequence and assures a gentle withdrawal of the sticks from the spilling edges, further minimizing abrasion of the tender coating which the sticks may carry. The centrifugal speed is adjusted tangentially to impel the sticks through the gates 78 to reach the partitions, with a trajectory over the conveyor surface 55, where further acceleration of movement may be effected by the latter, while retaining the sticks in the guiding chutes 82 until the conveyor surface takes over the burden of carrying the sticks.

The oriented sticks may be viewed in the columns afforded by the open-edged chutes 82, to observe if the pacing of the orientors is relatively uniform and to determine whether a supply is present in each chute, in uniformly spaced relation. The conveyor 55 serves to feed columns of sticks in parallelism.

From this point the feeder may be coupled to manual packaging or pick-up means (not shown), to provide a primary economic saving as the sticks thus oriented in columns of five or more may be more speedily manipulated for packaging by reason of this initial orientation.

It is contemplated that the discharge end of the conveyor 55 will serve to deposit the grouped columns of sticks continuously in closely grouped columns upon another conveyor, which is overlapped by the conveyor 55, providing further timing and conveyor inspection for the sticks arranged in columns for manual selection for packaging or for feeding to an automatic packaging machine at the terminal end of the conveyor.

By my invention, a feeder is provided in which widely spread, randomly arranged, elongated, preferably flat-sided units, such as fish sticks, may be fed rapidly, to orient or unscramble the sticks and to group them in columns of compact outline, conforming to predetermined layers for packaging.

While five turntables have been shown in the assembly to form a single grouped and oriented layer of that number in the package to be made, a greater number may be so assembled without making an unwieldy construction, by the features of my invention as described.

Thus, by the novel over-lapping staggered arrangement of the turntables described, with contiguous turntables rotated contrawise, close positioning of the converging, tangentially extended partitions and chutes may be effected in relation to the conveyor belt 55, to provide a close columnar arrangement of the units on the feed line, which may be used either for facile inspection and manual or automatic packaging, to effect economies in time, labor and reduce loss to the minimum.

Continuity of operation is further assured to avoid interrupted feed to the packaging operation by the construction which includes spaced peripheral gaps formed by the ledges about the turntables, so that if the units which carry coatings, such as batter or bread crumbs, are subjected to surface attrition, the crumbs may be by-passed from the feed line, to drop or be collected through the peripheral gaps about the turntables, while the centrifugal impelling of the units continues uninterruptedly to the feed line endless belt conveyor, and to the packaging machinery or to a station where this operation is manually performed, should it be found desirable.

Other features of my invention will occur to the skilled worker, as will the applicability of my invention, and accordingly, exemplification has been made for an understanding of the invention, but its scope is to be construed by the broader aspects of the appended claims.

Having thus described my invention and illustrated its use, what I claim as new and desire to secure by Letters Patent, is:

1. In an automatic feeder for a packaging assembly arranged to orient and group elongated units, such as fish sticks comprising, in combination, a cluster of turntables forming horizontal, centrifugal surfaces about vertical drive shafts, ledges substantially circumferentially about said turntables, each table having gates outlined by spaced, tangentially directed partitions, said partitions being angularly directed to converge in close columnar arrangement, and a conveyor surface forming a bottom for said partition.

2. In an automatic feeder for a packaging assembly to orient and group elongated units, such as fish sticks, comprising in combination a group of contiguously positioned turntables extending from vertically directed drive shafts, means for rotating adjacent drive shafts in directions contra to each other, ledges about said turntables, spaced, tangentially directed partitions leading from said ledges and directed contiguously and converging in parallelism to provide closely positioned, columnar partitions, and a belt conveyor forming a common bottom for said partitions.

3. In an automatic feeder for a packaging assembly to orient and group elongated units, such as fish sticks, comprising, in combination, a group of turntables, the centrifugal surfaces of which are horizontally extended, ledges substantially circumferentially enclosing said tables having gates outlined by spaced, tangentially directed partitions, cascading conveyors for said turntables having spillways overlying said tables in the leading position of said gates, and a conveying bottom for said partitions comprising an endless belt common to all said partitions.

4. In an automatic feeder for a packaging assembly to orient and group flat-sided units comprising, in combination, a plurality of turntables, a cascading conveyor arranged to receive random units, said conveyor having spill edges over said turntables, stationary ledges circumferentially enclosing said turntables, each of said ledges being joined to tangentially directed partitions, said partitions converging in a close columnar arrangement and a conveyor underlying said partitions.

5. An automatic feeder for orienting and grouping flat-sided units, such as fish sticks or the like, comprising, in combination, a plurality of cascading conveyors arranged to receive a random deposition of said units, turntables overlapped by said conveyors, means to rotate said turntables so that contiguous turntables are counter-rotated, circumferentially located ledges about said turntables toward which the units may be distributed in chordal position, take-off gates comprising tangentially directed partitions extending from each table converging upon a common conveyor, grouping said units in columnar arrangement.

6. An automatic feeder for orienting and grouping flat-sided units, such as fish sticks or the like, and separating the same from accumulated detritus, comprising, in combination, a plurality of cascading conveyors arranged to receive a random deposition of said units, turntables overlapped by said conveyors, means to rotate said turntables so that contiguous turntables are counter-rotated, circumferentially located ledges about said turntables toward which the units may be distributed in chordal position, take-off gates comprising tangentially directed partitions extending from each table converging upon a common conveyor, grouping said units in columnar arrangement, said ledges being spaced from said turntables to provide gaps through which said detritus may pass.

7. In an automatic feeder for a packaging assembly to orient and group flat-sided units, such as fish sticks or the like, preparatory to packaging, comprising, in combination, a group of turntables providing horizontal surfaces extending about vertical driving shafts therefor, said turntables being arranged in spaced planes, ledge means about said turntables, substantially tangential gate means from each turntable, partitions extending from each of the gate means terminating in a common plane and a conveyor for said partitions.

8. In an automatic feeder for a packaging assembly to orient and group elongated units, such as fish sticks or the like, to be packaged in columnar arrangement, comprising a group of turntables in close contiguous position forming horizontal surfaces and extending centrifugally active surfaces in spaced planes, ledges substantially circumferentially enclosing said turntables, take-off gates, tangentially directed partitions adjacent said gates at one end thereof and grouped in a common plane at the other end thereof, whereby said units are impelled in oriented columnar arrangement, a conveyor forming a bottom for said partitions to withdraw said units in oriented groups.

9. In an automatic feeder for a packaging assembly to orient and group elongated units, such as fish sticks, and to arrange the same in columns preparatory to packaging, comprising, in combination, a plurality of turntables providing horizontal, centrifugally distributing surfaces, ledges about said turntables, contiguously positioned gates for said ledges and feeding means for said turntables comprising cascading means, said cascading means having spill ends in a trailing position of said turntables with respect to said gates, said gates having tangentially extended partitions converging over a conveyor common to all of the partitions whereby said units are predeterminedly positioned on said conveyor.

10. An automatic feeder for orienting and grouping elongated units, such as fish sticks, preparatory to packaging, comprising, in combination, a plurality of contiguously positioned cascading conveyors arranged to receive a random deposit of said sticks, said conveyors having spaced spill edges, turntables underlying said spill edges, ledges about said turntables, predeterminedly positioned take-off gates, tangential guideways comprising partitions directed toward a conveyor whereby said units are impelled along said partitions and a common conveyor for said partitions, whereby the units are arranged in columns.

11. An assembly in accordance with claim 10 wherein said spill edges overlap said turntables to the trailing position of said take-off gates.

12. An assembly in accordance with claim 10 wherein said spill edges are spaced from said turntables within the limits of length of said units.

13. An automatic feeder assembly in accordance with claim 10 wherein said ledges are supported fixedly in relation to said turntables to provide a peripheral gap through which detritus from said turntables may escape while said units are impelled through said take-off gaps.

14. A feeder machine for orienting and grouping elongated units, such as fish sticks or the like, from a heterogeneous mass to deliver rows thereof to an inspection conveyor preparatory to packaging a predetermined number thereof which comprises in combination, a cascading distributing conveyor means upon which a random mass of the units may be deposited and distributed, said cascading means being spaced to spill onto a plurality of contiguous conveyors variably driven to attenuate the mass deposited thereon, means for receiving the cascaded deposit comprising a plurality of horizontal turntables means positioned axially, eccentrically to the cascading means, stationary ledge means on the said turntable means adjacent their peripheries to limit the radial movement of the units thereon and orient the units chordally to the ledge means, and substantially tangentially positioned take-off gate means for each of the turntable means comprising an open-bottom chute leading from each of the turntable means, a conveyor underlying said chute and upon which the units cascade, and partition means on said conveyor between which the units on said last conveyor are directed to maintain said units oriented in columns.

15. In an orienting feeder apparatus for fish sticks or like elongated articles, the combination of conveyors contiguously positioned to receive a promiscuous batch of the sticks, means for cascading said sticks and distributing the same to attenuate the batch, orientors contiguously grouped comprising staggeredly arranged turntables upon which the cascaded batch is deposited eccentrically, and rotationally operated radially to distribute the deposit, a ledge circumferentially enclosing the turntables chordally to position the sticks to the periphery of the turntable and substantially, tangentially positioned chutes comprising spaced partitions, each having one end adjacent one of said turntables and the other end of each of the chutes being contiguously grouped to form columns of the sticks and a conveyor for said chutes whereby a flow of said columns in unison is secured.

16. In an orienting feeder in accordance with claim 15 wherein said turntables are grouped in spaced horizontal planes and said partitions lead from said turntables to a common conveyor.

References Cited in the file of this patent

UNITED STATES PATENTS

| | | |
|---|---|---|
| 1,698,786 | Finn | Jan. 15, 1929 |
| 2,585,559 | Lakso | Feb. 12, 1952 |
| 2,612,255 | Leuschner | Sept. 30, 1952 |
| 2,792,099 | Hefft | May 14, 1957 |

FOREIGN PATENTS

| | | |
|---|---|---|
| 590,775 | Germany | Jan. 10, 1934 |